J. W. M. KIRKPATRICK.
Thrashing Machine.
No. 88,880.                  Patented April 13, 1869.
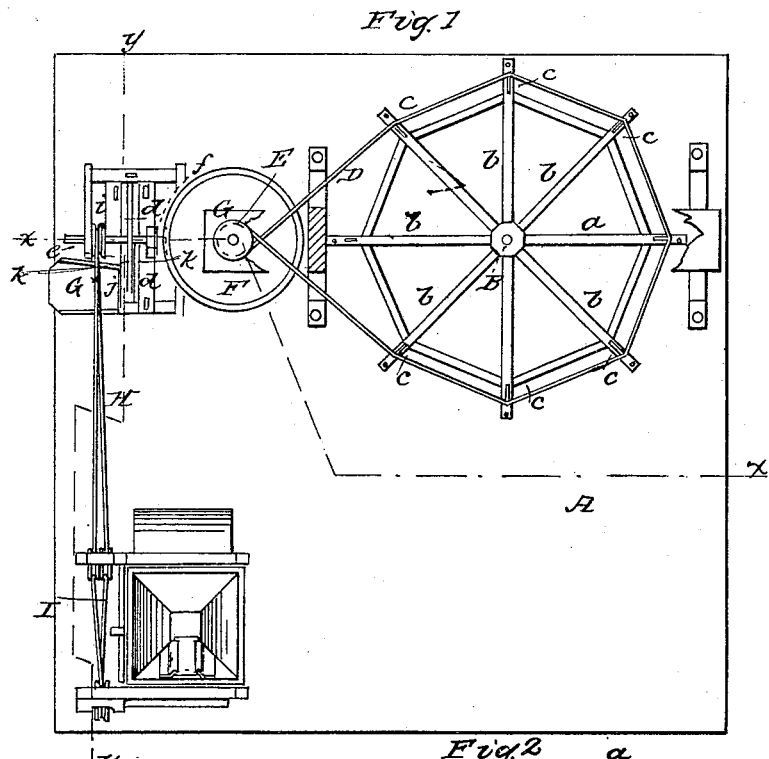
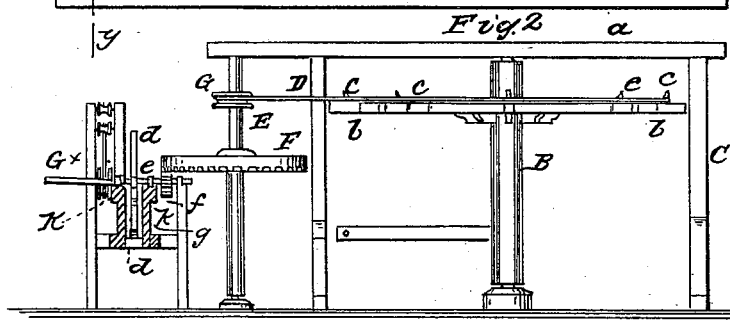
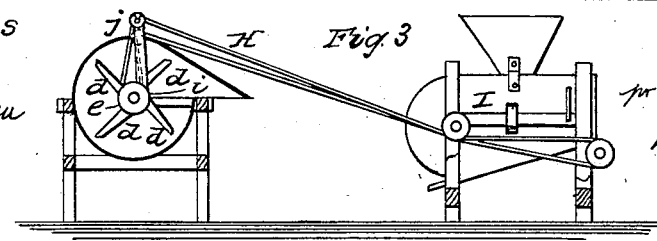
Witnesses
Chas Nida
Wm A Morgan
Inventor
J. W. M. Kirkpatrick

UNITED STATES PATENT OFFICE.

J. W. M. KIRKPATRICK, OF HAMBURG, ARKANSAS.

IMPROVEMENT IN THRASHING AND SEPARATING MACHINE.

Specification forming part of Letters Patent No. 88,880, dated April 13, 1869.

*To all whom it may concern:*

Be it known that I, J. W. M. KIRKPATRICK, of Hamburg, in the county of Ashley and State of Arkansas, have invented a new and useful Improvement in Operating Grain Thrashing and Separating Machines; and I do hereby declare that the following is a full, clear, and exact description thereof, which will enable those skilled in the art to make and use the same, reference being had to the accompanying drawings, forming part of this specification.

This invention relates to a new and useful improvement in operating grain threshing and separating machines, whereby, with one horse, the two machines, if desired, may be operated simultaneously, and by a very simple and economical arrangement of means.

In the accompanying sheet of drawings, Figure 1 is a plan or top view of my invention; Fig. 2, a vertical section of the same, taken in the line $x\ x$, Fig. 1; Fig. 3, a vertical section of the same, taken in the line $y\ y$, Fig. 1.

Similar letters of reference indicate corresponding parts.

A represents a base, on which the mechanism is secured; or, if the machinery is designed to be stationary, the frame of the same may be secured directly to the ground or earth. B is the driving or horse-power shaft, which is secured in a vertical position, and has its upper bearing in the cross-piece $a$ of a frame, C. This shaft, at its upper part, is provided with horizontal radial arms $b$, properly braced, and having pins $c$ inserted in their upper surfaces, a number of holes being in the upper surfaces of the arms, to admit of the pins being adjusted farther in or out, as desired, in order to keep the driving-belt D in a proper state of tension.

E is a vertical shaft, having upon it a horizontal toothed wheel, F, and a pulley, G, above F. This shaft E is driven by the belt D.

The toothed wheel F drives the thrashing-machine, which is constructed of beaters or arms $d$, attached to a horizontal shaft, $e$, on one end of which there is a pinion, $f$, into which the wheel F gears.

The beaters or arms $d$ work within a box, $g$, the sides of which, just below the shaft $e$, have metal bars $h\ h$ attached.

$G^\times$ is the feed-board on which the grain is fed to the thrashing-machine.

On the shaft $e$ of the thrashing-machine, at the outer side of the box $g$, there is a pulley, $i$, around which a belt, H, passes, said belt also passing around tightening or tension pulleys $j$. This belt H drives the fanning-mill or separator I, which may be constructed in any of the known ways.

The manner in which the separator is driven from the thrashing-machine by the belt H is shown clearly in Fig. 3.

By this arrangement both a thrashing-machine and separator may be driven by a single horse, or from one and the same horse-power.

This invention will effect a considerable saving in expense in driving or operating thrashing-machines and separators, and, although both machines may be operated jointly, either may be operated separately.

I claim as new and desire to secure by Letters Patent—

1. The horse-power B, when its arms $b$ are provided with a series of adjustable pins, $c$, whereby the tension of the belt D is regulated while the latter is in motion, as herein shown and described.

2. The thrashing-machine consisting of the box $g$, having the metal bars $h$, the beater-arms $d$ upon the shaft $e$, and the feed-board $G^\times$, in combination with the pinion $f$, gear-wheel F, pulley $i$, and tension-pulleys $j$, all arranged and operating as described, for the purpose specified.

The above specification of my invention signed by me this 16th day of December, 1867.

J. W. M. KIRKPATRICK.

Witnesses:
 JOHN CARROLL,
 G. W. MURPHY.